United States Patent
Haustein et al.

(10) Patent No.: US 8,346,736 B2
(45) Date of Patent: Jan. 1, 2013

(54) APPARATUS AND METHOD TO DEDUPLICATE DATA

(75) Inventors: Nils Haustein, Soergenloch (DE); Craig Anthony Klein, Tucson, AZ (US); Stephen Leonard Schwartz, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 500 days.

(21) Appl. No.: 12/404,988

(22) Filed: Mar. 16, 2009

(65) Prior Publication Data

US 2010/0235332 A1    Sep. 16, 2010

(51) Int. Cl.
  *G06F 7/00*    (2006.01)
(52) U.S. Cl. .................. 707/692; 707/693; 707/796
(58) Field of Classification Search .......... None
  See application file for complete search history.

(56) References Cited

U.S. PATENT DOCUMENTS

| 7,814,149 | B1 * | 10/2010 | Stringham | 709/203 |
| 2001/0037323 | A1 * | 11/2001 | Moulton et al. | 707/1 |
| 2008/0288482 | A1 * | 11/2008 | Chaudhuri et al. | 707/5 |
| 2009/0276467 | A1 * | 11/2009 | Scholtes et al. | 707/200 |
| 2010/0198797 | A1 * | 8/2010 | Wideman | 707/692 |

* cited by examiner

*Primary Examiner* — Fred I Ehichioya
*Assistant Examiner* — Hasanul Mobin
(74) *Attorney, Agent, or Firm* — Dale F. Regelman; Quarles & Brady LLP

(57) ABSTRACT

A method to deduplicate data by receiving a data set, setting a data chunk size, selecting a first stage deduplication algorithm, and selecting a second stage deduplication algorithm, where the first stage deduplication algorithm differs from the second stage deduplication algorithm. The method selects a data chunk, where that data chunk comprises all or a portion of the data set, performs a first stage deduplication analysis of the data chunk using the first stage deduplication algorithm. If the first stage deduplication analysis indicates duplicate data, then the method performs a second state deduplication analysis of said data chunk using the second stage deduplication algorithm to verify the data as duplicate. Only if both data deduplication analysis indicate duplicate data the data chunk is replaced by a deduplication stub or reference to the identical data chunk which is already stored.

15 Claims, 5 Drawing Sheets

APPARATUS AND METHOD TO DEDUPLICATE DATA

FIELD OF THE INVENTION

This invention relates to an apparatus and method to select a deduplication protocol for a data storage library.

BACKGROUND OF THE INVENTION

Computing systems generate information. It is known in the art to store such information using a plurality of data storage media. It is resource inefficient, however, to store redundant data.

Data deduplication, sometimes referred to as "intelligent compression" or "single-instance storage," is a method of reducing storage needs by eliminating redundant data. Only one unique instance of the data is actually retained on storage media, such as disk or tape. Redundant data is replaced with a pointer to the unique data copy. For example, a typical email system might contain 100 instances of the same one megabyte (MB) file attachment. If the email platform is backed up or archived, all 100 instances are saved, requiring 100 MB storage space. With data deduplication, only one instance of the attachment is actually stored; each subsequent instance is just referenced back to the one saved copy. In this example, a 100 MB storage demand could be reduced to only one MB.

Data deduplication offers other benefits. Lower storage space requirements will save money on disk expenditures. The more efficient use of disk space also allows for longer disk retention periods, which provides better recovery time objectives (RTO) for a longer time and reduces the need for tape backups. Data deduplication also reduces the data that must be sent across a WAN for remote backups, replication, and disaster recovery.

SUMMARY OF THE INVENTION

The invention comprises a method to deduplicate data. The method sets a data chunk size, selects a first stage deduplication algorithm, and selects a second stage deduplication algorithm, where the first stage deduplication algorithm differs from the second stage deduplication algorithm. The method selects a data chunk, where that data chunk comprising all or a portion of a data set, performs a first stage deduplication analysis of the data chunk using the first stage deduplication algorithm. If the first stage deduplication analysis indicates duplicate data, then the method performs a second state deduplication analysis of said data chunk using the second stage deduplication algorithm to verify the data as duplicate. Only if both data deduplication analysis indicate duplicate data the data chunk is replaced by a deduplication stub or reference to the identical data chunk which is already stored.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
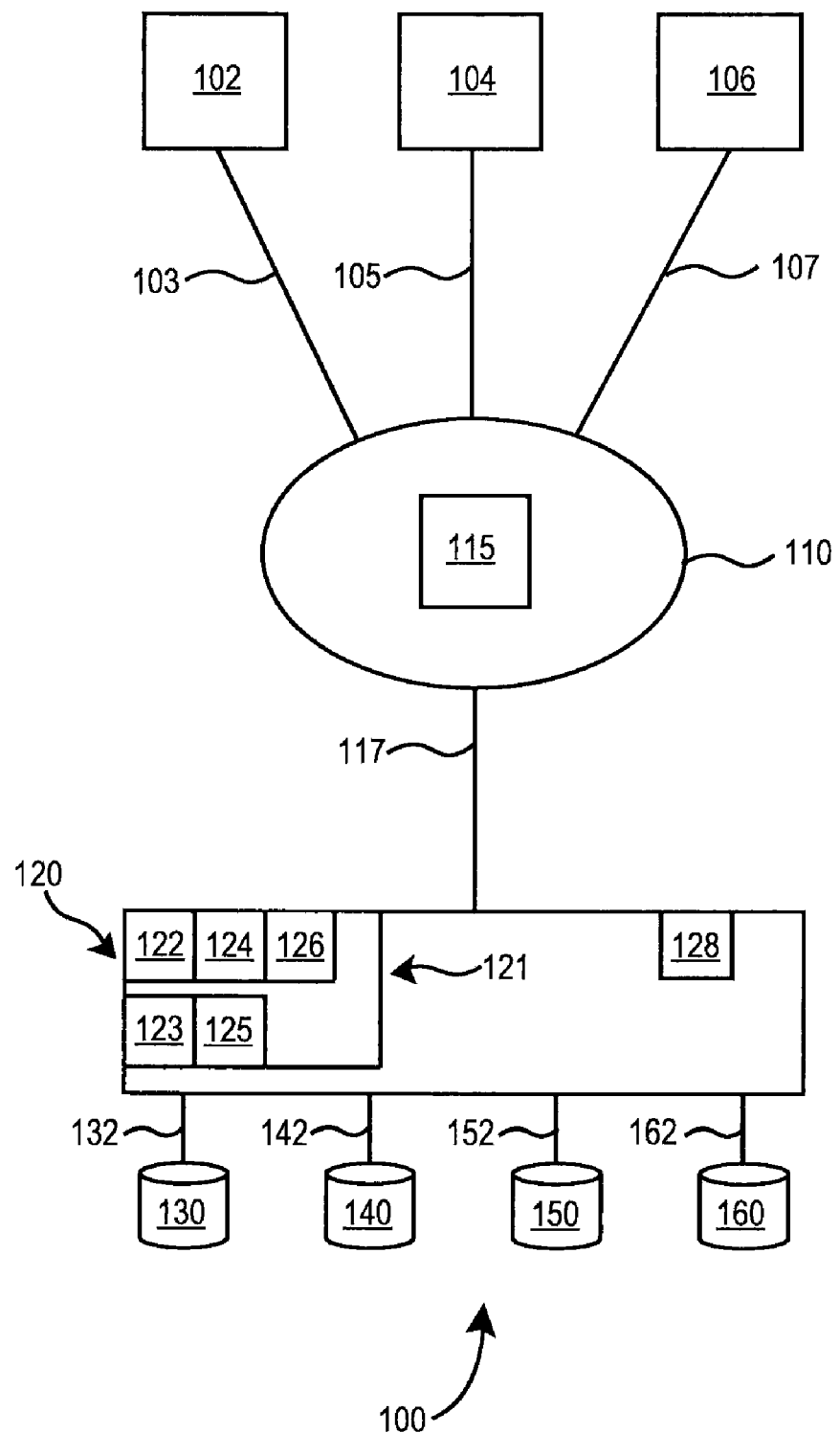
FIG. 1 is a block diagram showing one embodiment of Applicants' data storage system.

In the illustrated embodiment of FIG. 1, data processing system 100 comprises storage controller 120 and data storage media 130, 140, 150, and 160. In the illustrated embodiment of FIG. 1, storage controller 120 communicates with data storage media 130, 140, 150, and 160, via I/O protocols 132, 142, 152, and 162, respectively. I/O protocols 132, 142, 152, and 162, may comprise any sort of I/O protocol, including without limitation a fibre channel loop, SCSI (Small Computer System Interface), iSCSI (Internet SCSI), SAS (Serial Attach SCSI), Fibre Channel, SCSI over Fibre Channel, Ethernet, Fibre Channel over Ethernet, Infiniband, and SATA (Serial ATA).

By "data storage media," Applicants mean an information storage medium in combination with the hardware, firmware, and/or software, needed to write information to, and read information from, that information storage medium. In certain embodiments, the information storage medium comprises a magnetic information storage medium, such as and without limitation a magnetic disk, magnetic tape, and the like. In certain embodiments, the information storage medium comprises an optical information storage medium, such as and without limitation a CD, DVD (Digital Versatile Disk), HD-DVD (High Definition DVD), BD (Blue-Ray Disk) and the like. In certain embodiments, the information storage medium comprises an electronic information storage medium, such as and without limitation a PROM, EPROM, EEPROM, Flash PROM, compactflash, smartmedia, and the like. In certain embodiments, the information storage medium comprises a holographic information storage medium.

Further in the illustrated embodiment of FIG. 1, Applicants' storage controller 120 is in communication with host computers 102, 104, and 106. As a general matter, hosts computers 102, 104, and 106, each comprises a computing system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald). In certain embodiments, one or more of host computers 102, 104, and/or 106, further includes a storage management program. In certain embodiments, that storage management program may include the functionality of storage management type programs known in the art that manage the transfer of data to and from a data storage and retrieval system, such as for example and without limitation the IBM DFSMS implemented in the IBM MVS operating system.

In the illustrated embodiment of FIG. 1, Applicants' storage controller 120 comprises processor 128 and computer readable medium 121, microcode 122 written to computer readable medium 121, instructions 124 written to computer readable medium 121, a first stage hash algorithm 123 written to computer readable medium 121, and a second stage hash algorithm 125 written to computer readable medium 121. Processor 128 utilizes microcode 122 to operate storage controller 120. In the illustrated embodiment of FIG. 1, Applicants' storage controller 120 further comprises queue 126. Processor 128 performs certain operations related to data received from one or more host computers, such as for example and without limitation data deduplication.

In the illustrated embodiment of FIG. 1, host computers 102, 104, and 106, are connected to fabric 110 utilizing I/O protocols 103, 105, and 107, respectively. I/O protocols 103, 105, and 107, may be any type of I/O protocol; for example, a Fibre Channel ("FC") loop, a direct attachment to fabric 110 or one or more signal lines used by host computers 102, 104, and 106, to transfer information to and from fabric 110.

In certain embodiments, fabric 110 includes, for example, one or more FC switches 115. In certain embodiments, those one or more switches 115 comprise one or more conventional router switches. In the illustrated embodiment of FIG. 1, one or more switches 115 interconnect host computers 102, 104, and 106, to storage controller 120 via I/O protocol 117. I/O protocol 117 may comprise any type of I/O interface, for example, a Fibre Channel, Infiniband, Gigabit Ethernet, Ethernet, TCP/IP, iSCSI, SCSI I/O interface or one or more signal lines used by FC switch 115 to transfer information through to and from storage controller 120, and subsequently data storage media 130, 140, 150, and 160. In other embodiments, one or more host computers, such as for example and without limitation host computers 102, 104, and 106, communicate directly with storage controller 120 using I/O protocols 103, 105, and 107, respectively.

Figure 2A:
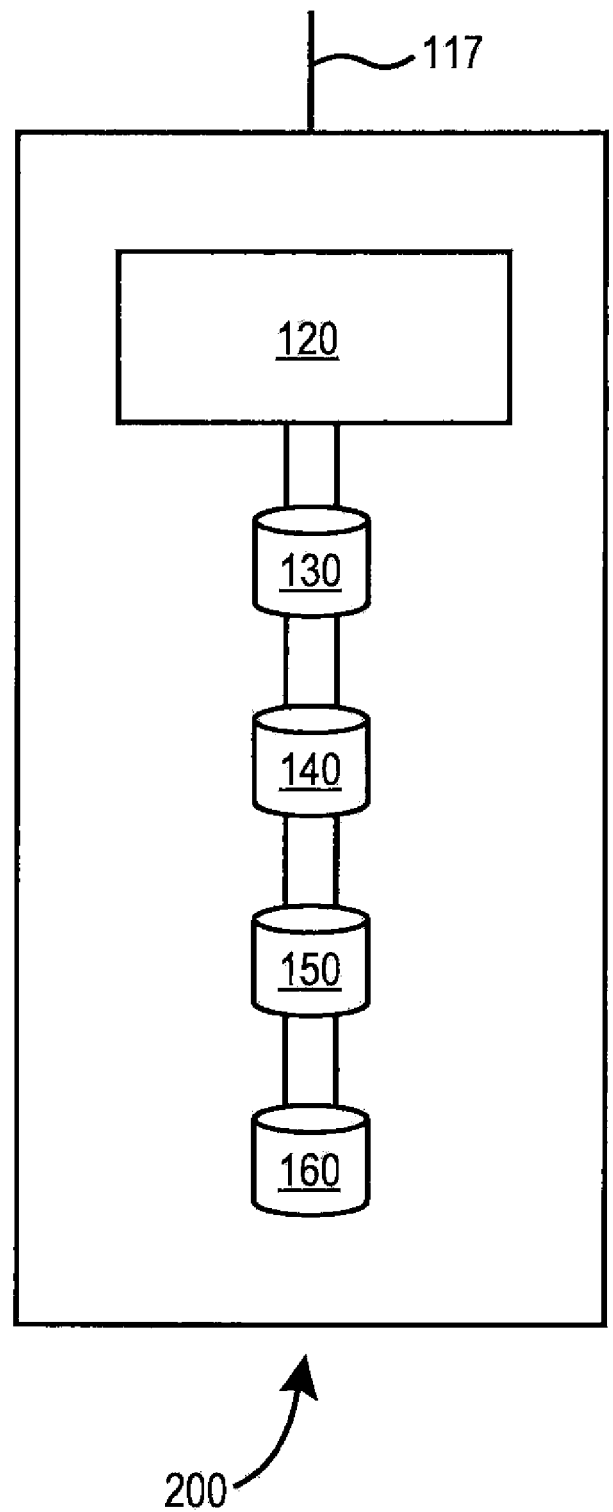
FIG. 2A is a block diagram showing one storage controller in communication with a plurality of data storage media using a fibre channel arbitrated loop.

In the illustrated embodiment of FIG. 2A, Applicants' storage controller 120 communicates with data storage media 130, 140, 150, and 160, using a fibre channel arbitrated ("FC-AL") loop of switches, wherein controller 120 and media 130, 140, 150, and 160, are disposed in information storage and retrieval system 200. As those skilled in the art will appreciate, information storage and retrieval system 200 further comprises additional elements, such as and without limitation one or more host adapters, one or more device adapters, a data cache, non-volatile storage, and the like. The illustrated embodiment of FIG. 2A should not be construed to limit Applicants' invention to use of fibre channel networks or devices. In other embodiments, other network topologies and devices are utilized, including without limitation SAS devices and/or SATA devices.

Figure 2B:
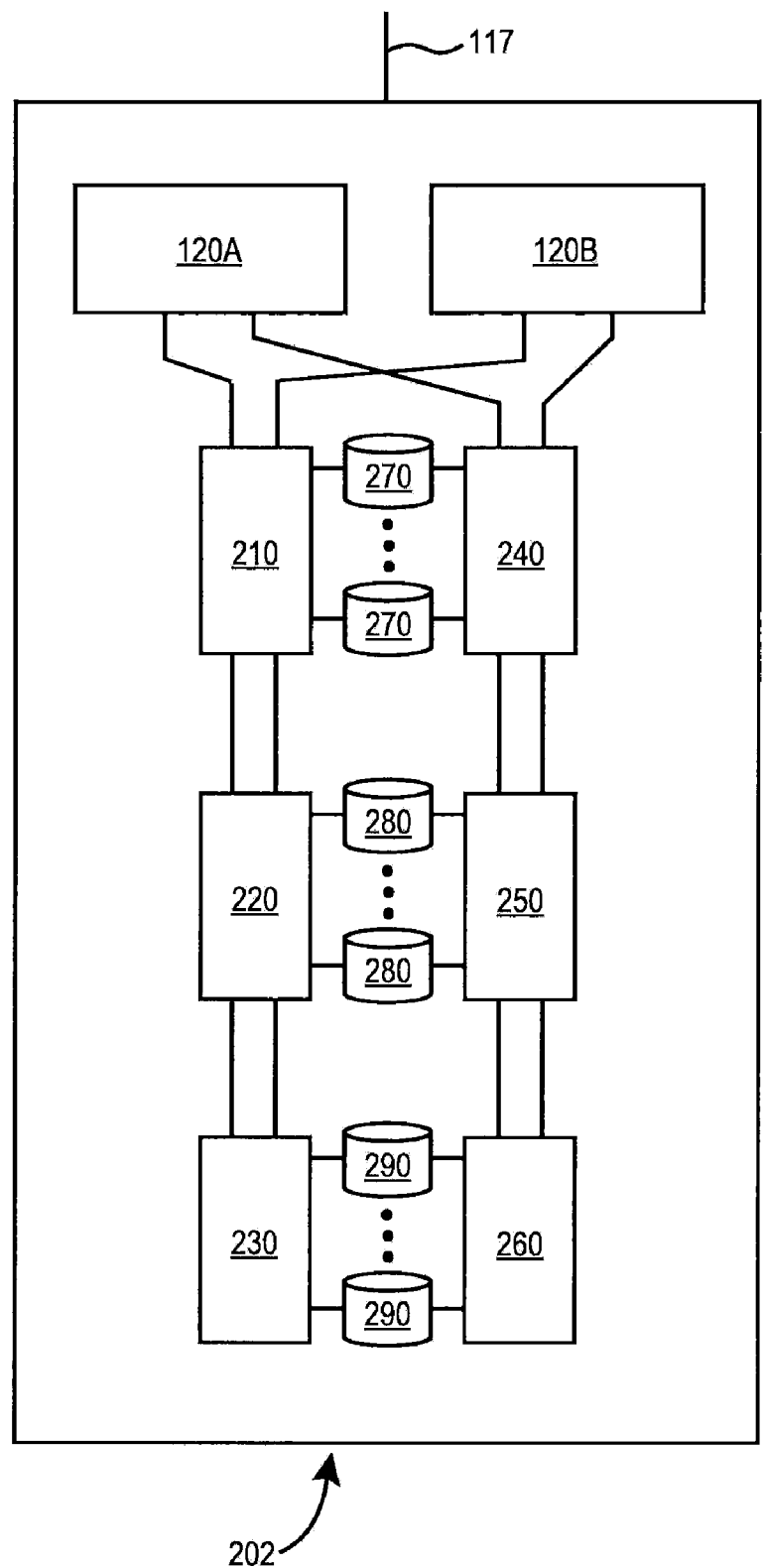
FIG. 2B is a block diagram showing two storage controllers in communication with a plurality of data storage media using dual fibre channel arbitrated loops.

In the illustrated embodiment of FIG. 2B, Applicants' information storage and retrieval system 202 comprises dual FC-AL loops of switches wherein storage controller 120A and storage controller 120B are interconnected with both FC-AL loops. Each FC-AL loop contains one or more local controllers, such as local controllers 210, 220, 230, 240, 250, and 260. As those skilled in the art will appreciate, information storage and retrieval system 200 further comprises additional elements, such as and without limitation one or more host adapters, one or more device adapters, a data cache, non-volatile storage, and the like. In the illustrated embodiment of FIG. 2B, each storage controller is in communication with a first plurality of data storage media 270, a second plurality of data storage media 280, and a third plurality of data storage media 290.

The illustrated embodiment of FIG. 2B should not be construed to limit Applicants' invention to use of fibre channel networks or devices. In the illustrated embodiment of FIG. 2B, the recitation of two FC-AL loops comprises one embodiment of Applicants' apparatus. In other embodiments, other network topologies and devices are utilized, including without limitation SAS devices and/or SATA devices.

As those skilled in the art will appreciate, data deduplication comprises a process to eliminate redundant data. In the deduplication process, duplicate data is deleted, leaving only one copy of the data to be stored. In certain embodiments, indexing of all data is still retained should that data ever be required. Deduplication is able to enhance the storage capability of a storage array because only unique data is stored.

Data deduplication can generally operate at the file or the data block level. File level deduplication eliminates duplicate files, but this is not always a very efficient means of deduplication, especially if the plurality of files do not contain identical data. With block level deduplication files or more general data streams are chunked into blocks of fixed or variable size. The deduplication process calculates an identity characteristic for each file or block and compares this against the identity characteristic of files or blocks which have been processed prior. If the identity characteristic matches the processed file or block might be referenced to the already stored instance. Applicants method however uses a second identity characteristic to assure identity. A typical method for calculating identity characteristics are hash algorithm, such as the hash algorithms recited in Table 1. Such a hash algorithm generates a Digest L, sometimes referred to as a "stub."

TABLE 1

| Name | Output bits of Digest L | Cycles/ byte | Normalized Cycles/byte | Probability of a Collision is 50% for $2^{L/2}$ chunks | Chance of one collision in 40 Petabytes using 4 KB/chunk |
|---|---|---|---|---|---|
| MD5 | 128 | 3.66 | 1:1 | $2^{64} \sim 10^{20}$ | $0.5 * 10^{-20}$ |
| SHA-1 | 160 | 8.30 | 2.27:1 | $2^{80} \sim 10^{24}$ | $0.5 * 10^{-28}$ |
| SHA-256 | 256 | 20.59 | 5.63:1 | $2^{128} \sim 10^{40}$ | $0.5 * 10^{-60}$ |
| SHA-512 | 512 | 40.18 | 10.98:1 | $2^{256} \sim 10^{80}$ | $0.5 * 10^{-140}$ |
| Whirlpool | 512 | 36.52 | 9.98:1 | $2^{256} \sim 10^{80}$ | $0.5 * 10^{-140}$ |

Table 1 recites five (5) hash algorithms. Applicants' method utilizes one or more of these hash algorithms to identify candidate files for deduplication. The descriptor "MDA5" is an acronym for Message-Digest Algorithm. "SHA" is an acronym for Secure HASH Algorithm.

Table 1 recites a length for a digest L produced by each algorithm, wherein that digest L comprises a fixed number of bits of output. Table 1 further recites, for each algorithm, a number of cycles per byte of data hashed. Table 1 further recites, for each algorithm, a normalized cycles per byte. The greater the number of cycles per byte, the slower the algorithm; however, as the length of the digest L increases, the greater is the efficiency of the hash algorithm to avoid collisions. By "Collision," Applicants mean creating an identical digest L for dissimilar data chunks.

If a file is updated, only the changed data is saved. That is, if only a few bytes of a document or presentation are changed, only the changed blocks or bytes must be saved, because the rest of the file has been saved already. With file level deduplication a changed file will be stored once again in its entireness. With block level deduplication only the changed blocks are saved and not the entire file. Therefore, block deduplication saves more storage space than file deduplication. However, block deduplication requires more processor resources.

Applicants' method utilizes a two stage analysis, utilizing in certain circumstances two different hash algorithms. A faster has algorithm is initially used. If that faster had algorithm indicates data duplication in a data chunk, then a slower and more accurate hash algorithm is then used.

Figure 3:
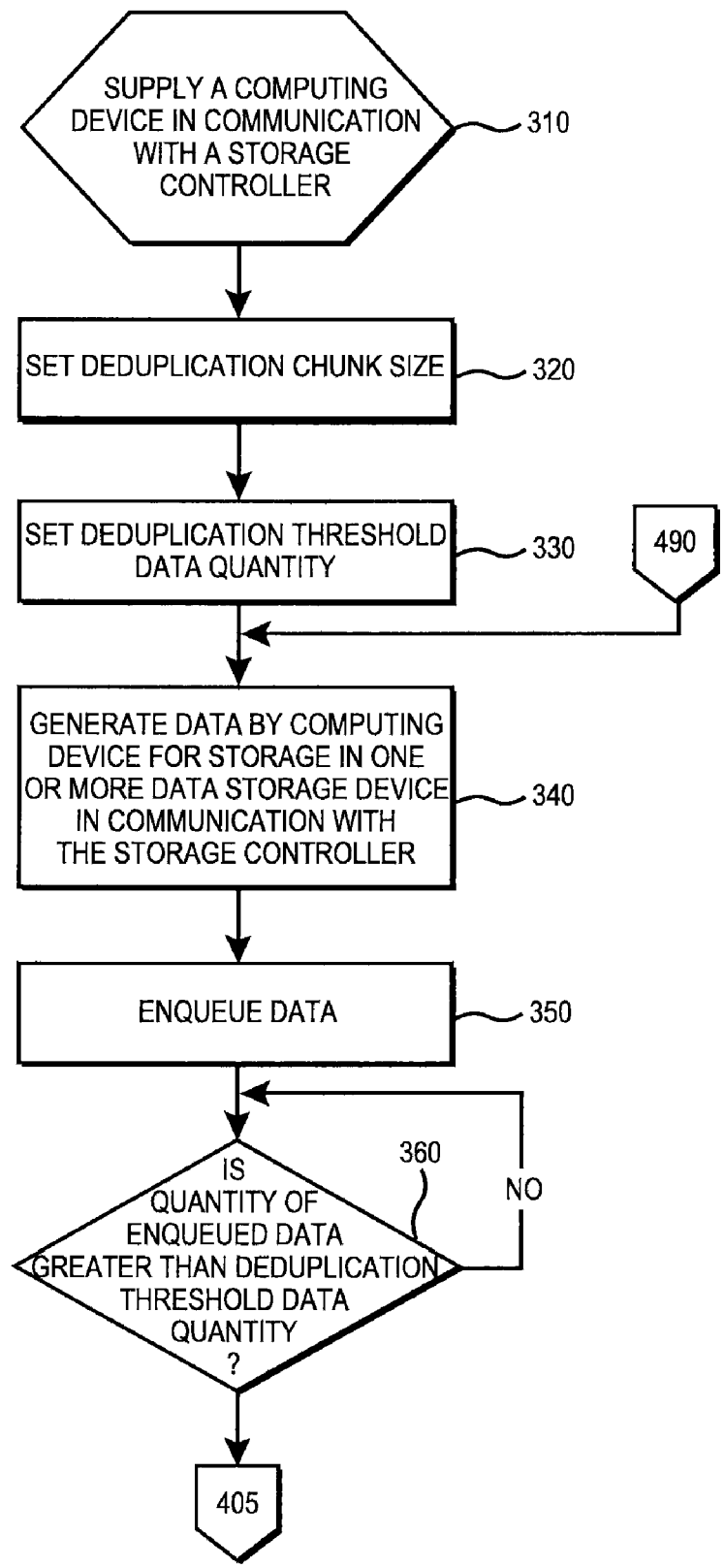
FIG. 3 is a flow chart summarizing certain steps in a first embodiment of Applicants' method.

Referring now to FIG. 3, in step 310 the method provides a computing device, such as for example on or more of host computers 102 (FIG. 1), 104 (FIG. 1), and/or 106 (FIG. 1), where that computing device is in communication with a storage controller, such as storage controller 120 (FIGS. 1, 2A, 2B). In step 320, the method establishes a deduplication chunk size. In certain embodiments, the deduplication chunk size of step 320 is set to the length, or a multiple thereof, of a data track written to a data storage medium. In certain embodiments, the deduplication chunk size of step 320 is set to the length, or a multiple thereof, of a data block written to a data storage medium.

In certain embodiments, step 320 is performed by a host computer of step 310. In certain embodiments, step 320 is performed by a storage controller of step 310. In certain embodiments, step 320 is set by a system operator using a system console in communication with the storage controller of step 310.

In step 330, the method establishes a deduplication threshold data quantity. In certain embodiments, the deduplication threshold data quantity of step 330 is set by a host computer of step 310. In certain embodiments, the deduplication threshold data quantity of step 330 is set by a storage controller of step 310. In certain embodiments, the deduplication threshold data quantity of step 330 is set by a system operator using a system console in communication with the storage controller of step 310.

In step 340, data is generated by the computing device of step 310, and wherein that data is provided to the storage controller of step 310. In step 350, the method enqueues the data of step 340. In certain embodiments, step 350 is performed by a host computer of step 310. In certain embodiments, step 350 is performed by a storage controller of step 310.

In step 360, the method determines if the quantity of enqueued data is greater than the deduplication threshold data quantity. In certain embodiments, step 360 is performed by a host computer of step 310. In certain embodiments, step 360 is performed by a storage controller of step 310.

If the method determines in step 360 that the quantity of enqueued data is not greater than the deduplication threshold data quantity, then the method pauses and monitors the amount of data enqueued in step 350. Alternatively, if the method determines in step 360 that the quantity of enqueued data is greater than the deduplication threshold data quantity, then the method transitions from step 360 to step 405 (FIG. 4)
wherein the method selects an (i)th data chunk, wherein (i) is initially set to 1, and wherein the data of step 340 comprises (N) data chunks. In certain embodiments, step 405 is performed by a host computer of step 310. In certain embodiments, step 405 is performed by a storage controller of step 310.

Figure 4:
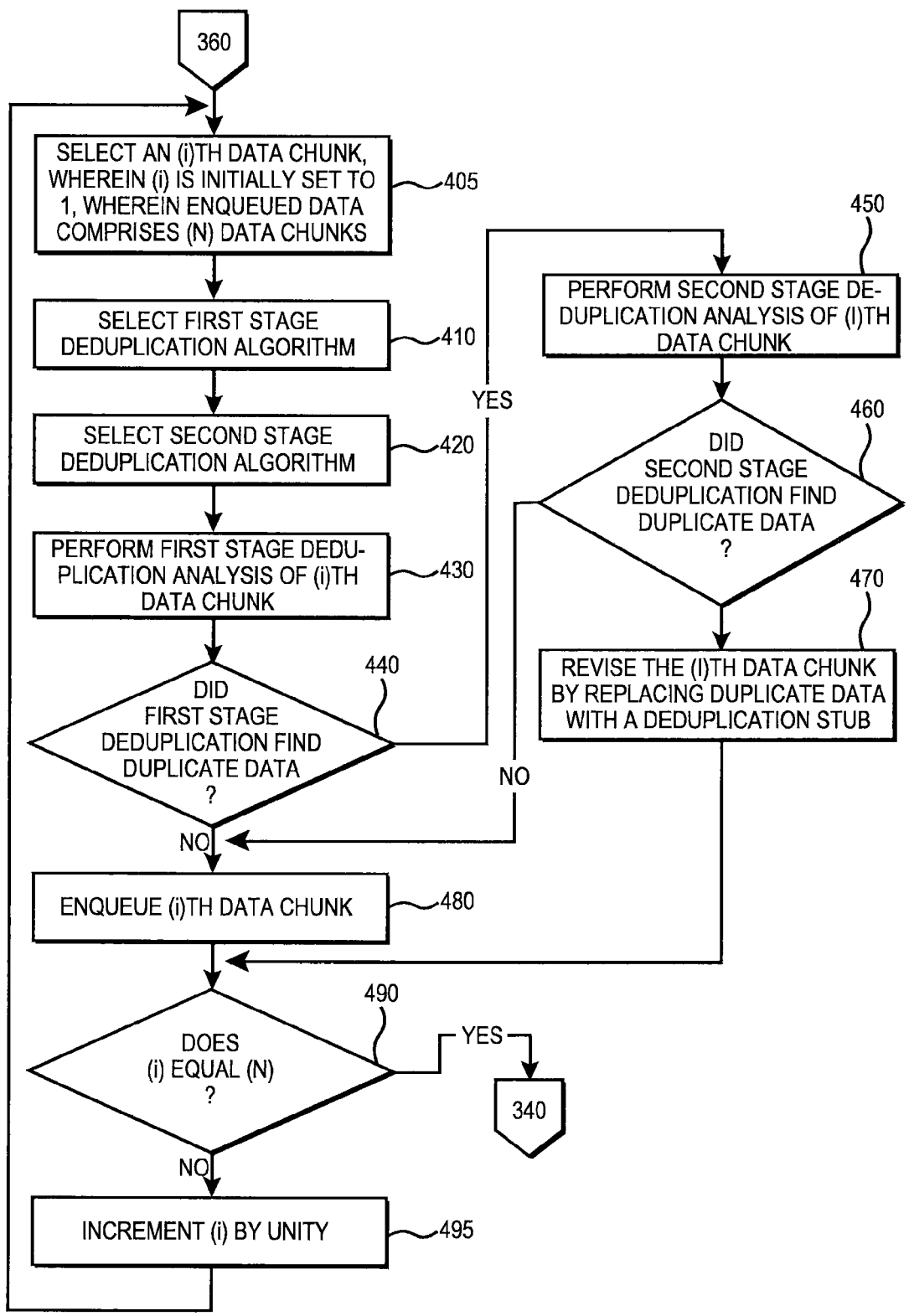
FIG. 4 is a flow chart summarizing certain steps in a second embodiment of Applicants' method.

Referring now to FIG. 4, in step 410 the method selects a first stage hash algorithm. In certain embodiments, the first stage hash algorithm of step 410 comprises a MD5 hash algorithm. In certain embodiments, the first stage hash algorithm of step 410 utilizes less than 4 cycles per byte of data hashed. In certain embodiments, step 410 is performed by a host computer of step 310. In certain embodiments, step 410 is performed by a storage controller of step 310.

In step 420, the method selects a second stage hash algorithm. In certain embodiments, the second stage hash algorithm of step 420 comprises a Secure HASH Algorithm. In certain embodiments, the second stage hash algorithm of step 420 utilizes more than 5 cycles per byte of data hashed. In certain embodiments, the second stage hash algorithm of step 420 utilizes more than 20 cycles per byte of data hashed. In certain embodiments, the second stage hash algorithm of step 420 utilizes about 40 cycles per byte of data hashed. In certain embodiments, step 420 is performed by a host computer of step 310. In certain embodiments, step 420 is performed by a storage controller of step 310.

In step 430, the method performs a first stage data deduplication analysis of the (i)th data chunk of step 405. In certain embodiments, step 430 is performed by a host computer of step 310. In certain embodiments, step 430 is performed by a storage controller of step 310.

In step 440, the method determines if the first stage deduplication analysis, using the first stage hash algorithm of step 410, found duplicate data. In certain embodiments, step 440 is performed by a host computer of step 310. In certain embodiments, step 440 is performed by a storage controller of step 310.

If the method determines in step 440 that the first stage deduplication analysis, using the first stage hash algorithm of step 410, did not find duplicate data, then the method transitions from step 440 to step 445 wherein the method stores the original (i)th data chunk. The method transitions from step 445 to step 490.

Alternatively, if the method determines that the first stage deduplication analysis, using the first stage hash algorithm of step 410, found duplicate data, then the method transitions from step 440 to step 450 wherein the method performs a second stage deduplication analysis, using the second stage hash algorithm of step 420. In certain embodiments, step 450 is performed by a host computer of step 310. In certain embodiments, step 450 is performed by a storage controller of step 310.

In step 460, the method determines if the second stage deduplication analysis, using the second stage hash algorithm of step 420, found duplicate data. In certain embodiments, step 460 is performed by a host computer of step 310. In certain embodiments, step 460 is performed by a storage controller of step 310.

If the method determines in step 460 that the second stage deduplication analysis, using the second stage hash algorithm of step 420, did not find duplicate data, then the method transitions from step 460 to step 445. Alternatively, if the method determines that the second stage deduplication analysis, using the second stage hash algorithm of step 420, found duplicate data, then the method transitions from step 460 to step 470 wherein the method revises the (i)th data chuck to replace duplicate data with a deduplication stub generated by the second stage hash algorithm. In certain embodiments, step 470 is performed by a host computer of step 310. In certain embodiments, step 470 is performed by a storage controller of step 310. From step 470 the method proceeds to step 480.

In step 480, the method stores the revised (i)th data chunk of step 470. In certain embodiments, step 480 is performed by a host computer of step 310. In certain embodiments, step 480 is performed by a storage controller of step 310.

In step 490, the method determines if (i) equals (N), i.e. if all the data generated in step 340 has been checked using a first stage data deduplication analysis. In certain embodiments, step 490 is performed by a host computer of step 310. In certain embodiments, step 490 is performed by a storage controller of step 310.

If the method determines in step 490 that if (i) equals (N), i.e. if all the data generated in step 340 has been checked using a first stage data deduplication analysis, then the method transitions from step 490 to step 340 and pauses until additional data is generated. Alternatively, if the method determines in step 490 that if (i) does not equal (N), i.e. not all the data generated in step 340 has been checked using a first stage data deduplication analysis, then the method transitions from step 490 to step 495 wherein the method increments (i) by unity, i.e. sets (i) equal to (i+1). The method transitions from step 495 to step 405 and continues as described herein.

In certain embodiments, individual steps recited in FIGS. 3 and 4, may be combined, eliminated, or reordered.

In certain embodiments, Applicants' invention includes instructions, such as instructions 124 (FIG. 1), residing in computer readable medium, such as for example computer readable medium 121 (FIG. 1) wherein those instructions are executed by a processor, such as processor 128 (FIG. 1), to perform one or more of steps 320, 330, 340, 350, and/or 360, recited in FIG. 3, and/or one or more of steps 405, 410, 420, 430, 440, 450, 460, 470, 480, 490, and/or 495, recited in FIG. 4.

In other embodiments, Applicants' invention includes instructions residing in any other computer program product, where those instructions are executed by a computer external to, or internal to, data storage systems 100 (FIG. 1) or 200 (FIG. 2A), or 202 (FIG. 2B), to perform one or more of steps 320, 330, 340, 350, and/or 360, recited in FIG. 3, and/or one or more of steps 405, 410, 420, 430, 440, 450, 460, 470, 480, 490, and/or 495, recited in FIG. 4. In either case, the instructions may be encoded in computer readable medium comprising, for example, a magnetic information storage medium, an optical information storage medium, an electronic information storage medium, and the like. By "electronic storage media," Applicants mean, for example and without limitation, one or more devices, such as and without limitation, a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to deduplicate data, comprising:
   receiving a data set;
   setting a data chunk size equal to a length of a data track written to a data storage medium;
   selecting a data chunk, wherein said data chunk comprises all or a portion of said data set;
   selecting a first stage deduplication algorithm that generates a Digest comprising 128 bits;
   selecting a second stage deduplication algorithm, that generates a Digest comprising 256 or 512 bits;
   performing a first stage deduplication analysis of said data chunk using said first stage deduplication algorithm;
   operative if said first stage deduplication analysis finds duplicate data, performing a second state deduplication analysis of said data chunk using said second stage deduplication algorithm,
   wherein said first stage deduplication algorithm utilizes 3.66 cycles per byte of data; and
   wherein said second stage deduplication algorithm utilizes 20.59 or 40.18 cycles per byte of data.

2. The method of claim 1, further comprising:
   enqueuing said data set as that data set is received; setting a deduplication threshold data quantity;
   determining if said enqueued data set exceeds said deduplication threshold data quantity;
   operative if said enqueued data set exceeds said deduplication threshold data quantity, performing said first stage deduplication analysis.

3. The method of claim 1, further comprising:
   operative if said second stage deduplication analysis finds duplicate data, forming a revised data chunk by replacing duplicate data with a deduplication stub.

4. The method of claim 3, further comprising:
   supplying a storage controller comprising a computer readable medium comprising a data queue;
   enqueuing said revised data chunk in said data queue.

5. The method of claim 4, further comprising generating said data set by a host computer in communication with said storage controller.

6. An article of manufacture comprising a microprocessor, and a computer readable medium comprising computer readable program code disposed therein to deduplicate data, the computer readable program code comprising a series of computer readable program steps to effect:
   receiving a data set;
   retrieving a pre-determined data chunk size equal to a length of a data track written to a data storage medium;
   selecting a data chunk, wherein said data chunk comprises all or a portion of said data set;
   selecting a first stage deduplication algorithm that generates a Digest comprising 128 bits;
   selecting a second stage deduplication algorithm that generates a Digest comprising 256 or 512 bits;
   performing a first stage deduplication analysis of said data chunk using said first stage deduplication algorithm;
   operative if said first stage deduplication analysis finds duplicate data, performing a second state deduplication analysis of said data chunk using said second stage deduplication algorithm,
   wherein said first stage deduplication algorithm utilizes 3.66 cycles per byte of data; and
   wherein said second stage deduplication algorithm utilizes 20.59 or 40.18 cycles per byte of data.

7. The article of manufacture of claim 6, the computer readable program code further comprising a series of computer readable program steps to effect:
   enqueuing said data set as that data set is received; setting a deduplication threshold data quantity;
   determining if said enqueued data set exceeds said deduplication threshold data quantity;
   operative if said enqueued data set exceeds said deduplication threshold data quantity, performing said first stage deduplication analysis.

8. The article of manufacture of claim 6, comprising the computer readable program code further comprising a series of computer readable program steps to effect:
   if operative if said second stage deduplication analysis finds duplicate data, forming a revised data chunk by replacing duplicate data with a deduplication stub.

9. The article of manufacture of claim 8, the computer readable program code further comprising a series of computer readable program steps to effect:
   supplying a storage controller comprising a computer readable medium comprising a data queue;
   enqueuing said revised data chunk in said data queue.

10. The article of manufacture of claim 9, the computer readable program code further comprising a series of computer readable program steps to effect receiving said data set from a host computer.

11. A computer program product comprising a non-transitory computer readable medium having computer readable program code, comprising:
   computer readable program code which causes said programmable processor to receive a data set;
   computer readable program code which causes said programmable processor to retrieve a pre-determined data chunk size equal to a length of a data track written to a data storage medium;
   computer readable program code which causes said programmable processor to select a data chunk, wherein said data chunk comprises all or a portion of said data set;
   computer readable program code which causes said programmable processor to perform a first stage deduplication analysis of said data chunk using a first stage deduplication algorithm that generates a Digest comprising 128 bits;
   computer readable program code which, if said first stage deduplication analysis finds duplicate data, causes said programmable processor to perform a second state deduplication analysis of said data chunk using said a second stage deduplication algorithm that generates a Digest comprising 256 or 512 bits,
   wherein said first stage deduplication algorithm utilizes 3.66 cycles per byte of data; and
   wherein said second stage deduplication algorithm utilizes 20.59 or 40.18 cycles per byte of data.

12. The computer program product of claim 11, further comprising:
   computer readable program code which causes said programmable processor to enqueue said data set as that data set is received;
   computer readable program code which causes said programmable processor to retrieve a deduplication threshold data quantity;
   computer readable program code which causes said programmable processor to determine if said enqueued data set exceeds said deduplication threshold data quantity;
   computer readable program code which causes said programmable processor to operative if said enqueued data set exceeds said deduplication threshold data quantity, performing said first stage deduplication analysis.

13. The computer program product of claim 11, further comprising: computer readable program code which, if said second stage deduplication analysis finds duplicate data, causes said programmable processor to form a revised data chunk by replacing duplicate data with a deduplication stub.

14. The computer program product of claim 13, wherein said storage controller comprises a computer readable medium comprising a data queue, further comprising computer readable program code which causes said programmable processor to enqueue said revised data chunk in said data queue.

15. The computer program product of claim 14, further comprising computer readable program code which causes said programmable processor to receive said data set from a host computer.

* * * * *